(12) United States Patent
Baker et al.

(10) Patent No.: US 11,129,494 B2
(45) Date of Patent: Sep. 28, 2021

(54) MOBILE PELLET FUELED VARIABLE FREQUENCY BARBECUE OVEN, ELECTRIC CABINET ASSEMBLY AND CONTROL CIRCUIT THEREOF

(71) Applicant: GMG OUTDOOR PRODUCTS (WUHAN) CO., Ltd, Hubei (CN)

(72) Inventors: David Winston Baker, Lakeside, OR (US); Ping Wang, Hubei (CN)

(73) Assignee: GMG OUTDOOR PRODUCTS (WUHAN) CO., LTD, Hubei (CN)

( * ) Notice: Subject to any disclaimer, the term of this patent is extended or adjusted under 35 U.S.C. 154(b) by 309 days.

(21) Appl. No.: 16/167,219

(22) Filed: Oct. 22, 2018

(65) Prior Publication Data
US 2019/0298107 A1    Oct. 3, 2019

(30) Foreign Application Priority Data
Apr. 3, 2018 (CN) .......................... 201810291323.9

(51) Int. Cl.
*A47J 37/07* (2006.01)
*B62D 63/06* (2006.01)
(Continued)

(52) U.S. Cl.
CPC .......... *A47J 37/0704* (2013.01); *A47J 36/32* (2013.01); *B60D 1/62* (2013.01); *B60D 1/66* (2013.01);
(Continued)

(58) Field of Classification Search
CPC ......... A47J 37/0704; A47J 36/32; B60D 1/62; B60D 1/66; B60P 3/0257; B60P 63/062;
(Continued)

(56) References Cited

U.S. PATENT DOCUMENTS

| | | | |
|---|---|---|---|
| 3,861,288 A | * | 1/1975 | Cluff, Sr. ............ A47J 37/0704 99/357 |
| 4,757,755 A | * | 7/1988 | Sarten ..................... A47J 37/06 108/44 |

(Continued)

*Primary Examiner* — Alfred Basichas
(74) *Attorney, Agent, or Firm* — Chun-Ming Shih; Lanway IPR Services

(57) ABSTRACT

The invention discloses a mobile pellet fueled variable frequency barbecue oven as well as an electric cabinet assembly and a control circuit thereof, and relates to the field of vehicle-mounted barbecue ovens. The mobile pellet fueled variable frequency barbecue oven includes a chassis assembly, wherein the chassis assembly is connected with an automobile; a cabinet arranged above the chassis assembly, wherein the cabinet consists of a lower cabinet and a fuel tank assembly which are arranged oppositely, and is provided with a barbecue oven cavity for accommodating a food grate; and an electric cabinet assembly, wherein both sides of the electric cabinet assembly are electrically connected with the cabinet and the automobile power supply respectively to provide working power for the barbecue oven and control stable power supply of the barbecue oven. The mobile pellet fueled variable frequency barbecue oven as well as the electric cabinet assembly and the control circuit thereof replace a power supply assembly and a circuit of a traditional vehicle-mounted electric barbecue oven through a low voltage actuator, thus realizing low power operation of the vehicle-mounted barbecue oven, realizing normal work during movement of the vehicle, broadening the applicable scenarios of the vehicle-mounted barbecue oven, and being more suitable for actual use requirements.

8 Claims, 2 Drawing Sheets

(51) Int. Cl.
  *F24B 1/20* (2006.01)
  *F24B 13/04* (2006.01)
  *F24C 1/16* (2006.01)
  *A47J 36/32* (2006.01)
  *B60D 1/62* (2006.01)
  *B60D 1/66* (2006.01)
  *B60P 3/025* (2006.01)
  *H02P 27/08* (2006.01)
  *H02P 29/024* (2016.01)

(52) U.S. Cl.
  CPC .......... *B60P 3/0257* (2013.01); *B62D 63/062* (2013.01); *F24B 1/207* (2013.01); *F24B 13/04* (2013.01); *F24C 1/16* (2013.01); *H02P 27/08* (2013.01); *H02P 29/027* (2013.01)

(58) Field of Classification Search
  CPC .. F24B 1/207; F24B 13/04; F24C 1/16; H02P 27/08; H02P 29/027
  See application file for complete search history.

(56) References Cited

U.S. PATENT DOCUMENTS

| | | | | |
|---|---|---|---|---|
| 4,823,684 | A * | 4/1989 | Traeger | A47J 37/0704 |
| | | | | 126/10 |
| 4,848,316 | A * | 7/1989 | Beller | F24B 1/207 |
| | | | | 126/276 |
| 6,736,050 | B1 * | 5/2004 | Monn | A47J 37/0704 |
| | | | | 126/25 R |
| 7,263,990 | B1 * | 9/2007 | Lenhart | F24C 3/14 |
| | | | | 126/268 |
| 2005/0133017 | A1 * | 6/2005 | Scialdone | A47J 37/0704 |
| | | | | 126/25 R |
| 2005/0155498 | A1 * | 7/2005 | Killion | A47J 37/0704 |
| | | | | 99/482 |
| 2008/0011285 | A1 * | 1/2008 | Milligan | A47J 37/041 |
| | | | | 126/25 R |
| 2008/0098902 | A1 * | 5/2008 | Mansfield | A47J 37/0786 |
| | | | | 99/339 |
| 2016/0095328 | A1 * | 4/2016 | Reed | A47J 37/0781 |
| | | | | 426/315 |
| 2019/0298107 | A1 * | 10/2019 | Baker | F24B 1/207 |
| 2020/0086780 | A1 * | 3/2020 | Baker | B60D 1/62 |

* cited by examiner

MOBILE PELLET FUELED VARIABLE FREQUENCY BARBECUE OVEN, ELECTRIC CABINET ASSEMBLY AND CONTROL CIRCUIT THEREOF

TECHNICAL FIELD

The invention relates to the field of vehicle-mounted barbecue ovens, in particular to a mobile pellet fueled variable frequency barbecue oven, an electric cabinet assembly and a control circuit thereof.

BACKGROUND

With the improvement of people's living standards and the emphasis on food health, electric barbecue ovens have gradually replaced charcoal barbecue ovens and gas barbecue ovens as a mainstream choice.

In recent years, vehicle-mounted barbecue oven products that combine electric barbecue ovens with vehicles have emerged. The vehicle-mounted barbecue oven products are powered by vehicle-mounted power supplies and can move and work with cars to meet the needs of people going out for outings and moving stalls.

However, the existing products for vehicle-mounted electric barbecue oven still have the following problems:

1. As the electric barbecue oven is a high power device, the power supply of the existing vehicle-mounted electric barbecue oven is a UPS with a booster drive mechanism, and DC energy of batteries supplies 220V AC to the electric barbecue oven by switching and conversion through an inverter to realize on-board operation of the electric barbecue oven. With such design, the power supply mechanism of the electric barbecue oven has a large volume and a short working time. And generally, it is necessary to supplement the power supply after working for about 6-7 hours.

2. The existing electric barbecue oven is mainly powered by an automobile power supply system. With the limits of power consumption and safety requirements of the existing automobile power supply system, the electric barbecue oven cannot be powered during movement of the automobile, so that it is difficult for the electric barbecue oven to realize the functions of baking in advance and heat preservation, limiting the scope of application of related products.

Due to the above problems, the existing vehicle-mounted electric barbecue oven products cannot work continuously during movement of vehicles, which affects the adaptability and practicability of the vehicle-mounted electric barbecue oven products.

SUMMARY OF THE INVENTION

In order to solve the defects in the prior art, the purpose of the invention is to provide a mobile pellet fueled variable frequency barbecue oven as well as an electric cabinet assembly and a control circuit thereof, which can work continuously while the vehicle is moving, and thus is more suitable for actual application requirements than the existing vehicle-mounted electric barbecue oven products.

In order to achieve the purpose, the technical solution of the invention is:

A mobile pellet fueled variable frequency barbecue oven integrally connected with an automobile, comprising:

a chassis assembly, wherein said chassis assembly is connected with the automobile;

a cabinet assembly, said cabinet assembly arranged above the chassis assembly, and said cabinet assembly comprising a lower cabinet, an upper rear cover which opposite to said lower cabinet and a front cover, wherein said cabinet assembly is provided with a barbecue oven cavity for containing at least a barbecue oven; and an electric control cabinet assembly, wherein the two sides of the electric control cabinet assembly are electrically connected with the cabinet assembly and the automobile power supply respectively to provide working power to the barbecue oven and control stable power supply of the barbecue oven.

On the basis of the technical solution, the lower cabinet and the fuel tank assembly are hinged through a hinge kit, and one side of the fuel tank assembly is connected with the lower cabinet through an air spring support.

On the basis of the technical solution, the portable pellet fuel-fired variable frequency barbecue oven further comprises a feeding mechanism assembly. The feeding mechanism assembly comprises a fuel tank and a feeding pipe, said pellet fuel is stored in the fuel tank, one end of the feeding pipe is communicated with the fuel tank, the other end of the feeding pipe is communicated with the barbecue oven cavity, and a feeding motor is arranged in the middle of the feeding pipe.

The invention further provides a control circuit of the pellet fuel-fired barbecue oven, which comprises:

an MCU processing circuit; and a low voltage actuator, said low voltage actuator connected with the MCU processing circuit for driving the MCU processing circuit to operate at a set power.

On the basis of the technical solution, the low voltage actuator comprises a first branch, a second branch and a third branch which are electrically connected with the MCU processing circuit after being connected in parallel with each other, said first branch is connected with an appliance of the barbecue oven, and is provided with an inverter and battery, said second branch is provided with an external power supply and a charging jack, and said third branch is connected with the automobile power supply.

On the basis of the technical solution, said control circuit further comprises a serial WIFI circuit, and said serial WIFI circuit is in signal connection with the MCU processing circuit for data switching with said MCU processing circuit.

On the basis of the technical solution, said control circuit further comprises an overcurrent protection detection circuit, and the said overcurrent protection detection circuit is connected with the MCU processing circuit through an IO interface for receiving control data sent by the MCU processing circuit.

On the basis of the technical solution, said control circuit further comprises a display circuit, and the said display circuit is electrically connected with the MCU processing circuit and comprises an LED display circuit and a passive buzzer circuit for audible and visual indication during operation processing.

The invention further provides an electric cabinet assembly of the pellet fuel-fired barbecue oven, which comprises:

an electric cabinet assembly; and a control circuit, which is arranged in the electric cabinet, wherein said the control circuit is electrically connected with the automobile power supply and an appliance of a user respectively.

Compared with the prior art, the invention has the following advantages:

(1) The control circuit of the mobile pellet fueled variable frequency barbecue oven of the invention replaces the power supply assembly and the circuit of traditional vehicle-mounted electric barbecue oven through a low voltage actuator, thus realizing low power operation of the vehicle-mounted barbecue oven, realizing normal functioning during the traveling of the vehicle, broadening the applicable scenarios of the vehicle-mounted barbecue oven, and becoming more suitable for actual use requirements.

(2) The mobile pellet fueled variable frequency barbecue oven of the invention realizes low power operation of the vehicle-mounted barbecue oven, prolongs the service time of the built-in power supply of the vehicle-mounted barbecue oven from the present 6-7 hours to 20-30 hours, and greatly expands the endurance time and service performance of the product.

(3) The mobile pellet fueled variable frequency barbecue oven of the invention can directly use the automobile power supply to meet functioning requirements without further circuit adjustment and redesign of the existing vehicle, and has the advantages of low cost, good safety and reliability.

(4) The electric cabinet assembly of the mobile pellet fueled variable frequency barbecue oven of the invention has optional power paths, and the power mode of the barbecue oven can be switched under different working conditions such as parking and driving of the vehicle, thereby reducing the frequency of use of built-in batteries, avoiding over discharge and over charge of the batteries, and prolonging the service life of the electric cabinet assembly.

DESCRIPTION OF THE PREFERRED EMBODIMENT

The invention will be further described in detail in combination with drawings and examples.

Figure 1:
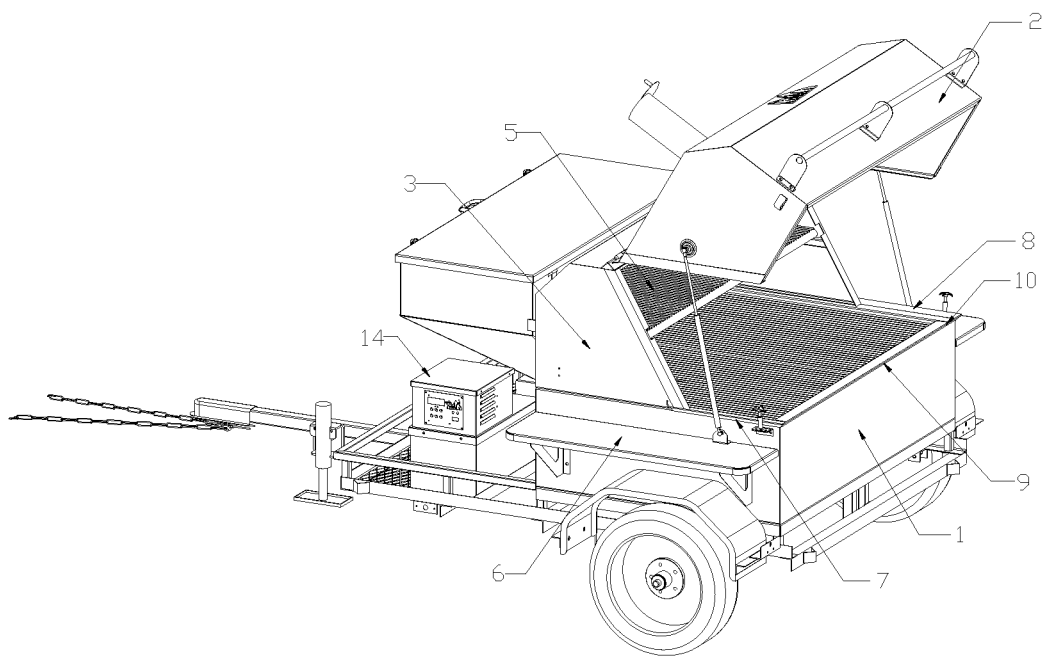
FIG. 1 is a structural diagram of a mobile pellet fueled variable frequency barbecue oven in one example of the invention.
Figure 2:
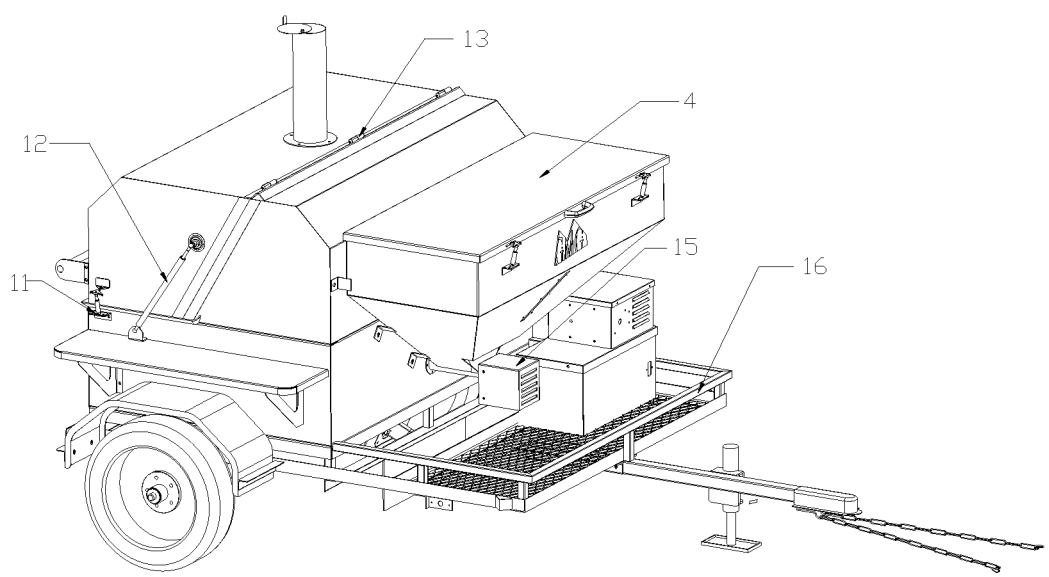
FIG. 2 is a structural diagram of the mobile pellet fueled variable frequency barbecue oven in one example of the invention.

As shown in FIG. 1 and FIG. 2, a mobile pellet fueled variable frequency barbecue oven of examples of the invention is integrally connected with an automobile, and comprises:

A chassis assembly 16, wherein the chassis assembly 16 is connected with the automobile;

A cabinet arranged above the chassis assembly 16, the cabinet consists of a lower cabinet 1, an upper rear cover assembly 3 and a front cover assembly 2 which are arranged oppositely, and is provided with a barbecue ovencavity for accommodating a food grate 5; the upper rear cover assembly 3 and the front cover assembly 2 are hinged through a hinge kit 13, one side of the lower cabinet 1 is provided with a side table assembly 6 extending in the horizontal direction, and one side of the front cover assembly 2 is connected with the side table assembly 6 in the lower cabinet 1 through an air spring support 12; and the side of the front cover assembly 2 is provided with a hook support 11 which can be fixedly connected with the lower cabinet 1.

In practical use, the barbecue oven can be configured in a first form in which the barbecue ovencavity is isolated from the outside when the front cover assembly 2 is closed; or configured in a second form in which the barbecue ovencavity is communicated with the outside when the front cover assembly 2 is open, so as to meet different needs during use of the barbecue oven. For example, the second form is workable when trailers travel and the barbecue oven heats to keep driving safety and heating effect; and the first form is workable when the barbecue oven works and goods are exhibited for sale, so that the goods can be accessed and exhibited conveniently.

When the barbecue oven is switched between the two forms, the front cover assembly 2 can move relative to the lower cabinet 1 along an articulated shaft of the hinge kit 13, and the air spring support 12 moves with the front cover assembly 2 during the movement to provide support for the front cover assembly 2, exposing/closing the barbecue ovencavity for holding the food grate for barbecue ovening.

In one example, an edge 9 composed of steel bars 10 is arranged in the barbecue ovencavity along the boundary extension direction of the lower cabinet constituting the barbecue ovencavity, specifically comprising a left edge side 7 and a right edge side 8, for providing support to the front cover assembly 2 when the barbecue oven is traveling with the vehicle and when the barbecue oven is turned off, preventing relative sliding from exposing the barbecue ovencavity and affecting the barbecue oven temperature and barbecue ovening effect.

The mobile pellet fueled variable frequency barbecue oven further comprises a feeding mechanism assembly 15. The feeding mechanism assembly 15 comprises a fuel tank assembly 4 communicated with the barbecue ovencavity and a feeding pipe, pellet fuel supporting operation of the barbecue oven is stored in the fuel tank assembly 4, one end of the feeding pipe is communicated with the fuel tank assembly 4, the other end of the feeding pipe is communicated with the barbecue ovencavity, and a feeding motor is arranged in the middle of the feeding pipe. When the barbecue oven works, pellet fuel in the fuel tank assembly 4 is fed into the barbecue ovencavity through the feeding pipe for combustion to provide heat energy required for the barbecue oven.

The mobile pellet fueled variable frequency barbecue oven further comprises an electric cabinet assembly 14 arranged above the chassis assembly 16, both sides of the electric cabinet assembly 14 are electrically connected with the cabinet and the automobile power supply respectively to provide working power to the barbecue oven and control stable power supply of the barbecue oven, specifically, provide energy and control for the operation of a heating assembly, the feeding motor and an exhaust gas circulation assembly of the barbecue oven.

Figure 3:
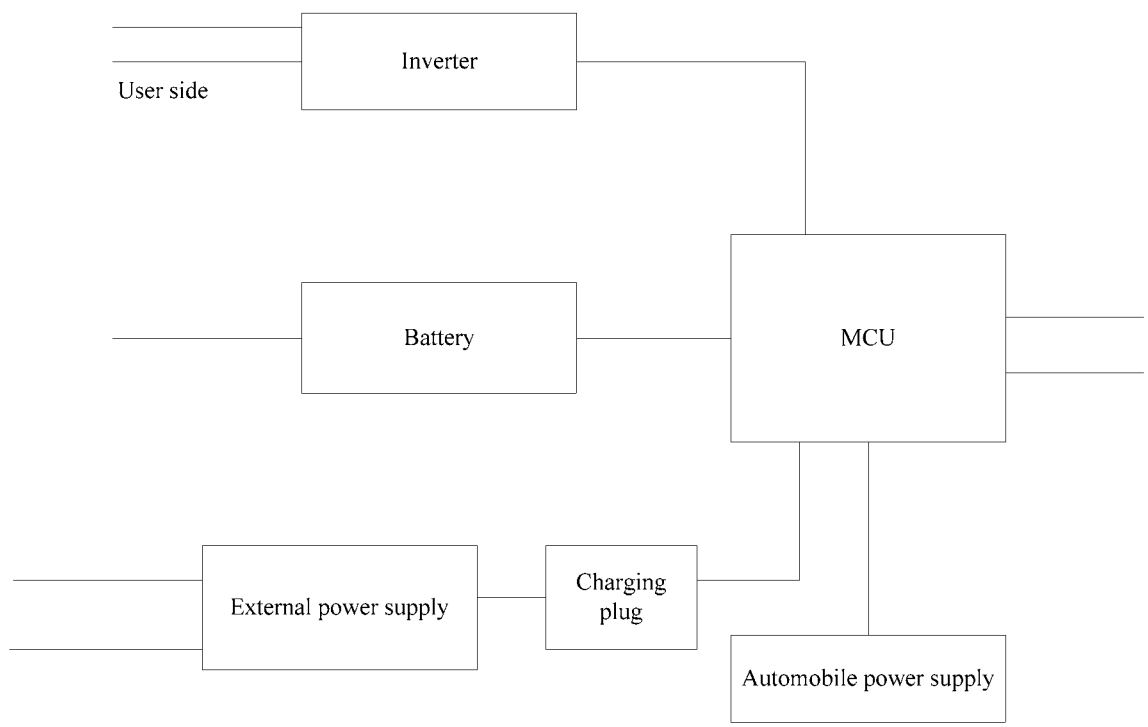
FIG. 3 is a circuit diagram of a power supply circuit of the mobile pellet fueled variable frequency barbecue oven in one example of the invention.

As shown in FIG. 3, the mobile pellet fueled variable frequency barbecue oven of the invention comprises a control circuit, the control circuit comprises:

An MCU processing circuit; said low voltage actuator connected with the MCU processing circuit for driving the MCU processing circuit to operate at a set power.

In one example, the low voltage actuator comprises a first branch, a second branch and a third branch which are electrically connected with the MCU processing circuit after being connected in parallel with each other. The first branch is connected with an appliance of the barbecue oven, and is provided with an inverter and batteries, the second branch is provided with an external power supply and a charging plug, and the third branch is connected with the automobile power supply.

During actual operation, the first branch of the low voltage actuator is connected to the power supply of the barbecue oven at the user side through the inverter and the batteries connected in parallel to convert alternating current supplied by the external power supply into direct current for normal operation of the barbecue oven so as to reduce the current supplied to the barbecue oven. Meanwhile, through the arrangement of the three branches and the control of the MCU processing circuit, the power supply of the barbecue oven can be flexibly switched under actual conditions. For example, batteries in the first branch are used to supply power when the automobile parks and the barbecue oven is taken out for normal work and sale; the automobile power supply in the third branch is used to supply power in the driving state or parking state of the automobile; and the external power supply in the second branch is used to supply power when a fixed external power supply is available, and the batteries in the first branch are charged when the second branch supplies power. Such multi-branch work mode can be switched and controlled by the MCU processing circuit controlled by an external input signal, which broadens the applicable scenarios of the vehicle-mounted barbecue oven and is more suitable for actual use requirements.

Preferably, a serial WIFI circuit can also be arranged in the control circuit, the serial WIFI circuit is in signal connection with the MCU processing circuit for data exchange with a drive circuit, so that the work state of the control circuit and the barbecue oven can be controlled and switched through a mobile terminal in real time, thus increasing the convenience of control. An overcurrent protection detection circuit can also be arranged, the overcurrent protection detection circuit is connected with the MCU processing circuit through an IO interface for receiving control data sent by the MCU processing circuit so as to prevent the barbecue oven or the control circuit from damaging the line due to the influence of circuit aging or abnormal current. A display circuit can also be arranged, the display circuit is electrically connected with the MCU processing circuit and comprises an LED display circuit and a passive buzzer circuit for audible and visual indication during operation, such as real-time monitoring and display of such operational data as working time, barbecue oven temperature, battery capacity and power supply voltage, and alarming when the set time is up or when the barbecue oven temperature is abnormal.

The invention further provides a mobile pellet fueled variable frequency barbecue oven comprising an electric cabinet assembly provided with the control circuit, the electric cabinet assembly comprises:

An electric cabinet; and a control circuit arranged in the electric cabinet, wherein the control circuit is electrically connected with the automobile power supply and an appliance of a user respectively.

The invention is not limited to the above embodiments, those of ordinary skill in the art can make various improvements and modifications without departing from the principles of the invention, and the improvements and modifications shall also be incorporated in the protection scope of the invention. The contents that are not described in detail in the specification are well known to a person skilled in the art.

The invention claimed is:

1. A mobile pellet fueled barbecue oven, which is connected with an automobile as a whole, comprising:
    a chassis assembly, said chassis assembly is connected with the automobile;
    a cabinet assembly, said cabinet assembly arranged above the chassis assembly, and said cabinet assembly comprising a lower cabinet, an upper rear cover assembly which opposite to said lower cabinet and a front cover assembly, and said cabinet assembly is provided with a barbecue oven cavity for containing at least a barbecue oven;
    an electric control cabinet assembly, the two sides of the electric control cabinet assembly are electrically connected with the cabinet assembly and the automobile power supply respectively to provide working power to the barbecue oven barbecue oven and control stable power supply of the barbecue oven;
    the upper rear cover assembly and the front cover assembly are hinged through a hinge kit, and one side of the front cover assembly is connected with the side table assembly in the lower cabinet through an air spring support; and
    an edge composed of steel bars is arranged in the barbecue oven cavity along the boundary extension direction of the lower cabinet constituting the barbecue oven cavity, said edge comprises a left edge side and a right edge side, for providing support to the front cover assembly when the barbecue oven is traveling with the vehicle and when the barbecue oven is turned off.

2. A mobile pellet fueled barbecue oven as claimed in claim 1, further comprising a feeding mechanism assembly, The feeding mechanism assembly comprises a fuel tank and a feeding pipe, said pellet fuel is stored in the fuel tank, one end of the feeding pipe is communicated with the fuel tank, the other end of the feeding pipe is communicated with the barbecue oven cavity, and a feeding motor is arranged in the middle of the feeding pipe.

3. A mobile pellet fueled barbecue oven as claimed in claim 1, further comprising a control circuit that includes:
    an MCU processing circuit; and
    a low voltage actuator, said low voltage actuator connected with the MCU processing circuit for driving the MCU processing circuit to operate at a set power.

4. A mobile pellet fueled barbecue oven as claimed in claim 3, wherein the low voltage actuator comprises a first branch, a second branch and a third branch which are electrically connected with the MCU processing circuit after being connected in parallel with each other, said first branch is connected with an appliance of the barbecue oven, and is provided with an inverter and battery, said second branch is provided with an external power supply and a charging jack, and said third branch is connected with the automobile power supply.

5. A mobile pellet fueled barbecue oven as claimed in claim 3, wherein said control circuit further comprises a serial WIFI circuit, and said serial WIFI circuit is in signal connection with the MCU processing circuit for data switching with said MCU processing circuit.

6. A mobile pellet fueled barbecue oven as claimed in claim 3, wherein said control circuit further comprises an overcurrent protection detection circuit, and said overcurrent protection detection circuit is connected with the MCU processing circuit through an IO interface for receiving control data sent by the MCU processing circuit.

7. A mobile pellet fueled barbecue oven as claimed in claim 3, wherein said control circuit further comprises a display circuit, and said display circuit is electrically connected with the MCU processing circuit and comprises an LED display circuit and a passive buzzer circuit for audible and visual indication during processing.

8. A mobile pellet fueled barbecue oven as claimed in claim 1, further comprising:
  an electric cabinet assembly; and
  a control circuit including:
    a MCU processing circuit; and
    a low voltage actuator, said low voltage actuator connected with the MCU processing circuit for driving the MCU processing circuit to operate at a set power,
  wherein said control circuit is arranged in the electric cabinet, wherein said control circuit is electrically connected with the automobile power supply and an appliance of a user respectively.

\* \* \* \* \*